United States Patent [19]

Nihei

[11] 4,331,402
[45] May 25, 1982

[54] SINGLE-LENS REFLEX CAMERA

[75] Inventor: Takahiro Nihei, Hachioji, Japan

[73] Assignee: Olympus Optical Co., Ltd., Tokyo, Japan

[21] Appl. No.: 206,891

[22] Filed: Nov. 14, 1980

[30] Foreign Application Priority Data

Nov. 29, 1979 [JP] Japan ............................. 54/164183[U]

[51] Int. Cl.³ ........................ G03B 7/00; G03B 19/12
[52] U.S. Cl. ..................................... 354/59; 354/152; 354/224; 354/225
[58] Field of Search .................. 354/55, 59, 152, 224, 354/225

[56] References Cited

U.S. PATENT DOCUMENTS 3,468,233 9/1969 Schmidt .............................. 354/55
4,068,246 1/1978 Arai ................................. 354/23 R

FOREIGN PATENT DOCUMENTS 2907244 9/1979 Fed. Rep. of Germany .
52-14412 2/1977 Japan .
52-80746 11/1977 Japan .
54-115130 9/1979 Japan .

Primary Examiner—Russell E. Adams
Attorney, Agent, or Firm—Frishauf, Holtz, Goodman and Woodward

[57] ABSTRACT

A single-lens reflex camera comprises a movable mirror, a detection mirror, and a mechanism for driving both mirrors. The movable mirror has a light transmitting section mounted on a support plate to swing between a first position where the movable mirror leads light transmitted through a camera lens to a finder and a second position where the movable mirror allows the light to reach a shutter screen. The detection mirror is mounted on the movable mirror to swing between a first position where the detection mirror leads light transmitted through the light transmitting section to the detector for focusing and a second position where the detection mirror blocks up the light transmitting section. The mechanism includes a driving source for swinging the movable mirror between the first and second positions, a cam surface formed in the support plate, and a pin mounted on the detection mirror and capable of engaging the cam surface. The cam surface causes the pin to swing the detection mirror from the first position to the second position when the movable mirror is swung from the first position to the second position by the driving source, and from the second position to the first position when the movable mirror is swung from the second position to the first position.

15 Claims, 10 Drawing Figures though the light transmitting or half-transmitting section of the movable mirror. Use of shielding means for intercepting the inverse incident light will, however, complicate the construction of the device. When the movable mirror is moved out of the optical path, moreover, the detection mirror fixed on the back of the movable mirror will inevitably be put in the optical path. In order to eliminate such drawbacks, there is proposed a driving mechanism to drive the detection mirror in a folding manner, interlocking with the movement of the movable mirror. As an example of such mechanism, there is a reflector driving system for a single-lens reflex camera with a built-in exposure meter disclosed in Japanese Patent Publication No. 51253/72.

SINGLE-LENS REFLEX CAMERA

BACKGROUND OF THE INVENTION

This invention relates to a single-lens reflex camera, and more specifically to a single-lens reflex camera provided with a mirror driving mechanism for swinging a movable mirror having a focusing detection mirror used for a focusing detecting device.

In a prior art focusing detecting device, a detection mirror is fixed on a movable mirror at right angles to the back of the movable mirror so that part of light transmitted through a camera lens may be led to the detection mirror through a light transmitting or half-transmitting section of the movable mirror. Accordingly, when the movable mirror is moved off the optical path of the camera lens, inverse incident light from a finder eyepiece section will be undesirably transmitted through the light transmitting or half-transmitting section of the movable mirror. Use of shielding means for intercepting the inverse incident light will, however, complicate the construction of the device. When the movable mirror is moved out of the optical path, moreover, the detection mirror fixed on the back of the movable mirror will inevitably be put in the optical path. In order to eliminate such drawbacks, there is proposed a driving mechanism to drive the detection mirror in a folding manner, interlocking with the movement of the movable mirror. As an example of such mechanism, there is a reflector driving system for a single-lens reflex camera with a built-in exposure meter disclosed in Japanese Patent Publication No. 51253/72.

In this mechanism, a detection mirror is swingably mounted on the back of a movable mirror, and a pin attached to one end of an extended section on the back of the detection mirror is guided by a guide groove formed in an extended section on the back of the movable mirror. A spring is interposed between these two mirrors. The two mirrors are so biased as to be separated from each other by the spring. As a result, the detection mirror is removed from the movable mirror until the pin abuts against one end of the guide groove, thereby opening an aperture of the movable mirror. The movable mirror is swingably mounted on the base plate of the camera body by means of a guide arm swingably mounted on the base plate. On the other hand, one end of a driving lever with the other end rotatably mounted on the base plate is pivotally mounted on the extended section of the movable mirror. The movable mirror is swung when the driving lever is continuously driven to swing by a shutter. Further, the driving lever has a pin fixed thereon at a portion a little ahead of the other end portion of the extended section of the detection mirror. As the driving lever swings, this pin engages the other end portion of the extended section of the detection mirror, and causes the detection mirror to swing to the movable mirror side against the biasing force of the spring.

The mechanism of such conventional type, however, requires a number of parts or components which complicates the construction, undesirably leading to a reduction in detection accuracy.

SUMMARY OF THE INVENTION

Accordingly, the object of this invention is to provide a single-lens reflex camera including a mirror driving mechanism which is simple in construction due to a reduced number of parts and is high in detection accuracy.

According to an aspect of the invention, there is provided a single-lens reflex camera comprising a support plate, a first mirror having a light transmitting section at a part thereof and pivotally mounted on the support plate to swing between a first position where the first mirror leads light transmitted through a camera lens to a finder section and a second position where the first mirror allows the light to reach a shutter screen; a second mirror pivotally mounted on the first mirror to swing between a first position where the second mirror leads light transmitted through the light transmitting section in a predetermined direction and a second position where the second mirror blocks up the light transmitting section; and a mirror driving mechanism for driving the first and second mirrors, the mirror driving mechanism including driving means for swinging the first mirror between the first and second positions, a cam surface formed in one of the support plate and the second mirror, and an engaging member provided to the other of the support plate and the second mirror and capable of engaging the cam surface, the cam surface causing the engaging member to swing the second mirror from the first position to the second position when the first mirror is swung from the first position to the second position by the driving means, and to cause the engaging member to swing the second mirror from the second position to the first position when the first mirror is swung from the second position to the first position by the driving means.

BRIEF DESCRIPTION OF THE DRAWINGS

The accompanying drawings show an embodiment of the single-lens reflex camera according to this invention, in which.

DETAILED DESCRIPTION OF THE PREFERRED EMBODIMENT

Now there will be described a single-lens reflex camera with a focusing detector according to an embodiment of this invention with reference to the accompanying drawings.

Figure 1:
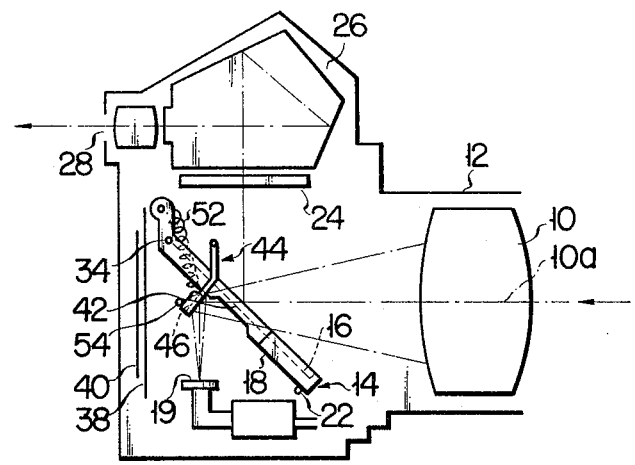
FIG. 1 is a schematic general view.

Referring now to FIG. 1, a camera lens 10 is set in a lens barrel at the front of a camera body 12. A movable mirror 14 as a first mirror is located aslant so as to cross the optical axis 10a of the camera lens 10. The movable mirror 14 is composed of a mirror section 16 which is formed of a glass plate with optical flatness and a half-mirror film attached to the camera lens side surface of the glass plate, and a frame section 18 supporting the mirror section 16. A through hole 42 as mentioned later is defined inside the frame section 18 in the vicinity of the optical axis 10a. An evaporation film for effectively reflecting light from the camera lens is formed over the whole surface of the half-mirror film but the portion corresponding to the through hole 42. The frame section 18 of the movable mirror 14 is interposed between a pair of support plates 20 and 21 (FIGS. 2 and 3) which are fixed inside the camera body 12, and the movable mirror 14 is also supported by these plates so as to be able to swing around first shaft sections 14a within the camera body 12. These support plates 20 and 21 define both sides of a chamber containing the movable mirror 14 inside the camera body 12, respectively. The support plates 20 and 21 are each provided with a first pin 22 which supports the under surface of the frame section 18 of the movable mirror 14 to maintain the movable mirror 14 in a first position where the mirror 14 upwardly reflects the light from the camera lens 10.

A focusing screen 24 and a pentaprism 26 of conventional types are successively disposed over the movable mirror 14 inside the camera body 12 so as to receive the reflected light from the movable mirror 14. Further, a finder eyepiece section 28 is disposed at the back of the pentaprism 26 to receive the light therefrom. The focusing screen 24, pentaprism 26, and finder eyepiece section 28 constitute a finder section. A detector 19 for focusing is set on the base plate of the camera body on the opposite side of the movable mirror 14 to the finder eyepiece section 28.

Figure 2:
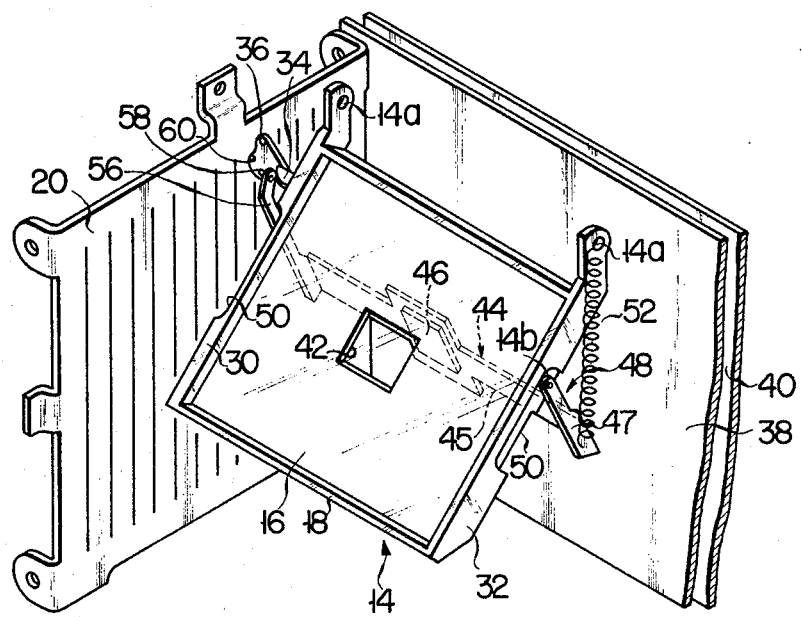
FIG. 2 is a broken away, perspective view of the interior of the camera.
Figure 3:
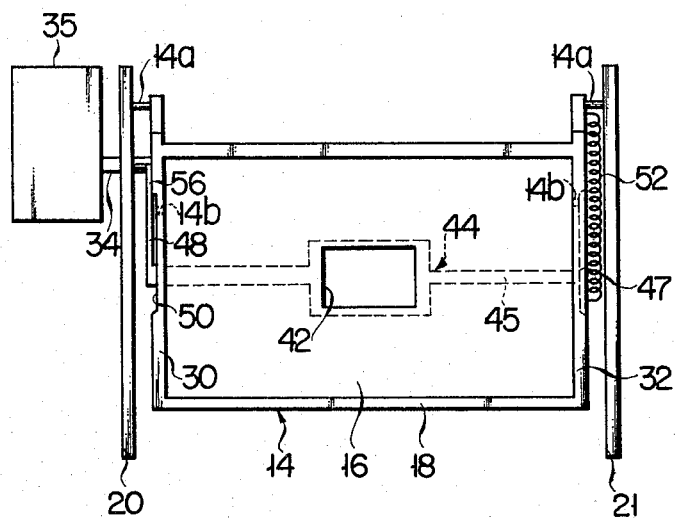
FIG. 3 is a front view of the camera interior shown in FIG. 2.

First and second side plates 30 and 32 are continuously provided on both sides of the frame section 18 of the movable mirror 14, respectively. A kick pin 34 is attached to the first side plate 30 which faces the support plate 20. Formed on the support plate 20 is a groove 36 in which the pin 34 is loosely fitted. The pin 34 is long enough to penetrate the support plate 20 on the first side plate 30 side and to stand out by a prescribed length. At the tip portion of the pin 34, a driving source 35 for the movable mirror 14 is disposed so as to engage the pin 34. The groove 36 is so formed that the tip of the pin 34 may not be prevented from being kicked by the driving source 35 to swing upward to a second position. In FIGS. 1 and 2, numerals 38 and 40 designate a shutter screen and a film, respectively. When the movable mirror 14 is in the second position, the light transmitted through the camera lens 10 can be led to the shutter screen 38 or film 40 without being intercepted by the movable mirror 14.

As mentioned before, the through hole 42 is defined in the glass plate and the frame section 18 of the movable mirror 14 in the vicinity of the optical axis of the camera lens 10, and part of the light in the vicinity of the optical axis transmitted through the glass plate and the half-mirror film of the movable mirror 14 is led as a detection light for focusing toward the back side of the movable mirror 14 through the through hole 42. On the back side of the movable mirror 14, there is a detection mirror 44 as a second mirror which is swingably attached to the movable mirror 14 so as to receive the detection light and lead it to the detector 19 on the camera base plate. The detection mirror 44 consists of a mirror section 46 and a support section 48 which includes a support bar 45 to support the mirror section 46 and a pair of support arms 47 extending from both ends of the support bar 45 and pivotally mounted on the two side plates 30 and 32 of the movable mirror 14 so as to be able to swing around second shaft sections 14b.

A tension spring 52 is stretched between the lower end of the support arm 47 of the detection mirror 44 mounted on the second side plate 32 of the movable mirror 14 and the upper end of the second side plate 32. A second stopper pin 54 is attached to the support plate 20. The second stopper pin 54 prevents the detection mirror 44 from being excessively urged by the spring 52. As a result, the angle formed between the movable mirror 14 and the detection mirror 44 becomes approximately 90°, and the detection mirror 44 is maintained in a first position where the light from the camera lens 10 is led to the detector 19. An extended section 56 as one component of an engaging member is continuously integrally formed on the upper side of the support arm 47. A pin 58 as the other component of the engaging member is formed at the tip of the extended section 56. Formed in the support plate 20 is a cam groove 60 in which the pin 58 is fitted so that the swing of the detection mirror 44 may be controlled by the swing of the movable mirror 14. The inner peripheral surface of the cam groove 60 forms a cam surface. As described in detail later, the cam surface is formed substantially circular so that the detection mirror 44 may be swung toward its second position where it touches the back of the movable mirror 14 when the movable mirror 14 is kicked upward, as shown in FIGS. 4 to 9 in succession. The two side plates 30 and 32 of the movable mirror 14 are each provided with a notch 50. The notch 50 is intended to allow the detection mirror 44 to be fully in contact with the back of the movable mirror 14 so that the through hole 42 of the movable mirror 14 may be completely blocked up by the detection mirror 44 when the detection mirror 44 is swung to the second position.

Referring now to the drawings of FIGS. 4 to 9, there will be described the operation of the mirror driving mechanism of the single-lens reflex camera of the above-mentioned construction.

Figure 4:
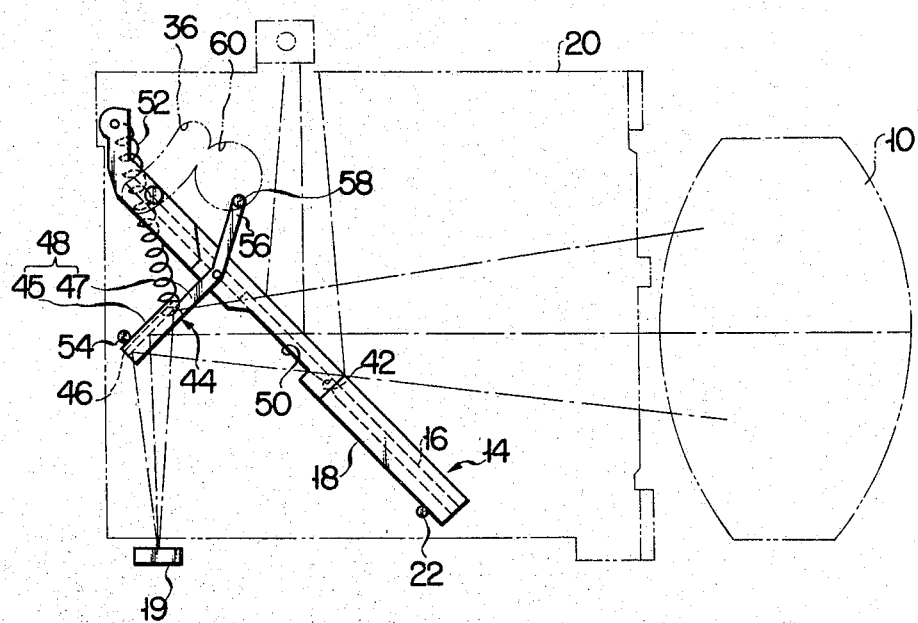
FIGS. 4 to 9 are schematic side views for successively illustrating actions of mirrors.

FIG. 4 shows a state before a shutter (not shown) is pressed, in which the movable mirror 14 engages the first stopper pin 22 to maintain its first position, and the detection mirror 44 is biased by the spring 52 to engage the second stopper pin 54, thereby maintaining its first position. In this state, partial light in the vicinity of the optical axis 10a out of the light from the camera lens 10 is transmitted through the half-mirror film and the glass plate of the movable mirror 14, passes through the through hole 42, and is reflected by the detection mirror 44 to be led to the detector 19 for focusing, where it is subjected to focusing detection. On the other hand, the greater part of light other than the partial light in the vicinity of the optical axis is reflected by the movable mirror 14 to be led to the finder section above. At this time, the pin 58 at the extended section 56 of the detection mirror 44, which is then located in the cam groove 60, is not in contact with the cam surface of the groove 60.

Subsequently, when the shutter is pressed, the detection mirror 44 acts as shown in FIGS. 5 to 9 in succession.

Figure 5:
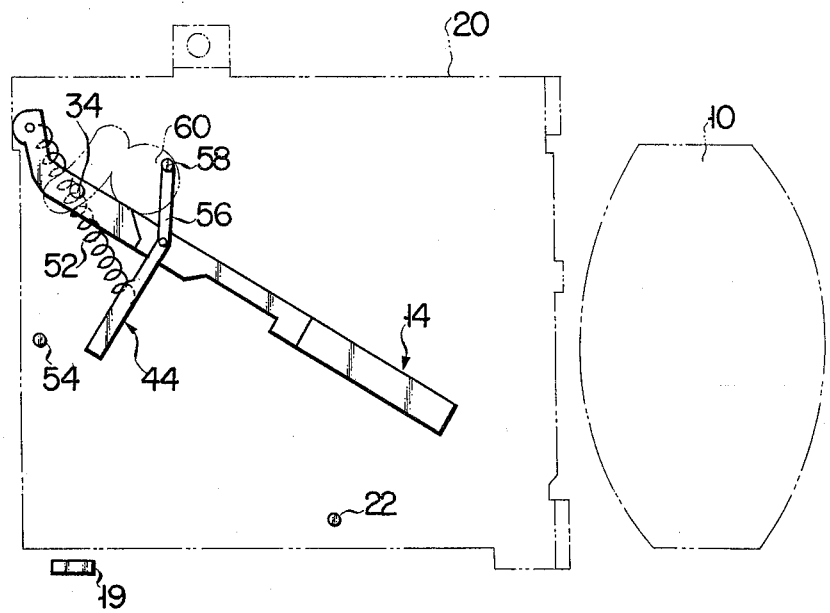
Figure 6:
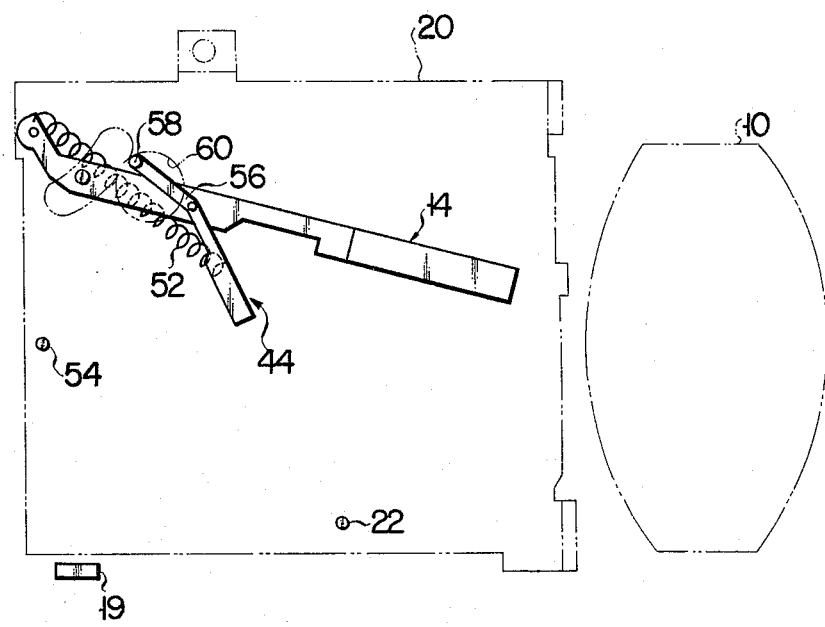
Figure 7:
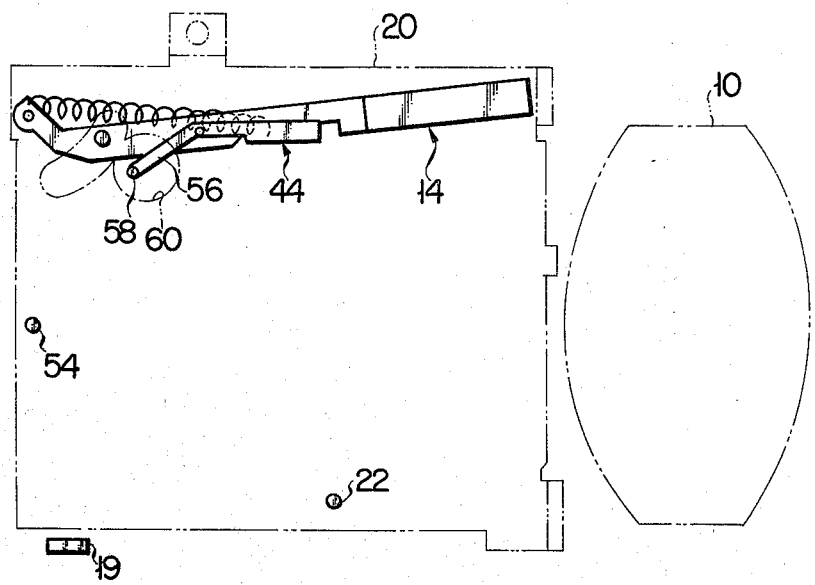

When the shutter is released, the kick pin 34 on the first side plate 30 of the movable mirror 14 is kicked up, and the movable mirror 14 starts to swing around the first shaft section 14a in the counterclockwise direction as shown, i.e. from the first position to the second. As the movable mirror 14 starts swinging, the detection mirror 44 is released from the engagement with the second stopper pin 54, and temporarily swings clockwise around the second shaft section 14b until the pin 58 abuts against the cam surface of the cam groove 60. Then, the pin 58 moves along the cam surface of the cam groove 60 to cause the detection mirror 44 to swing together with the movable mirror 14 until the movable mirror 14 reaches a position as shown in FIG. 5. Thereafter, when the movable mirror 14 swings further, the pin 58 is forced down by the cam surface of the cam groove 60, so that the detection mirror 44 is swung against the biasing force of the spring 52 in the counterclockwise direction, that is, toward the second position where the detection mirror 44 touches the movable mirror 14, as shown in FIG. 6. Further, the detection mirror 44 is swung by the cam surface of the cam groove 60, and the line of action of the spring 52 is located above the swing axis of the detection mirror 44. Then, the clockwise biasing direction of the spring 52 is reversed, so that the biasing force on the detection mirror 44 is changed to the counterclockwise direction in which the detection mirror 44 is urged toward the movable mirror 14. Accordingly, the detection mirror 44 is swung by the biasing force of the spring 52 without following the cam surface of the cam groove 60, and the pin 58 leaves the cam surface of the cam groove 60. Then, the detection mirror 44 swings up to the second position where it touches the movable mirror 14, thereby blocking up the through hole 42 of the movable mirror 14 and coming closely in contact with the movable mirror 14 to provide a state as shown in FIG. 7. Thus, the movable mirror 14 reaches its second position.

Figure 8:
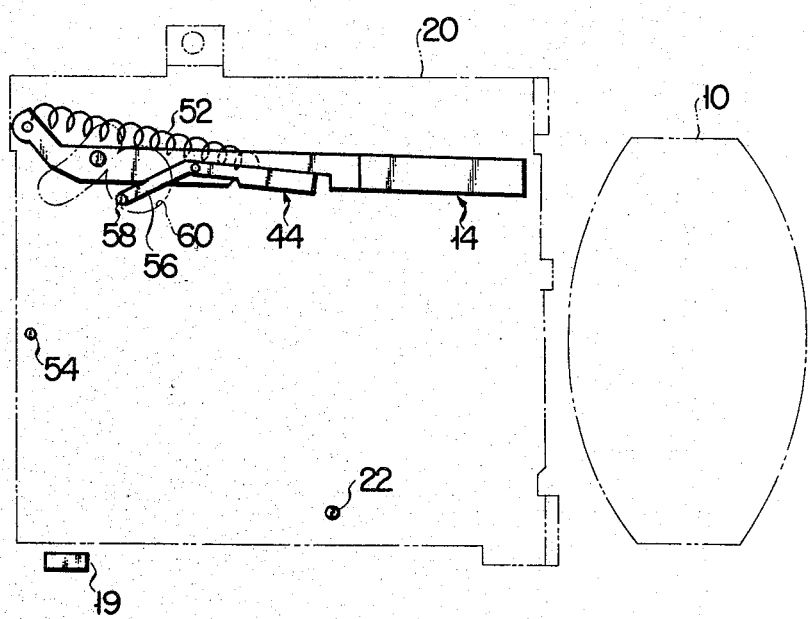
Figure 9:
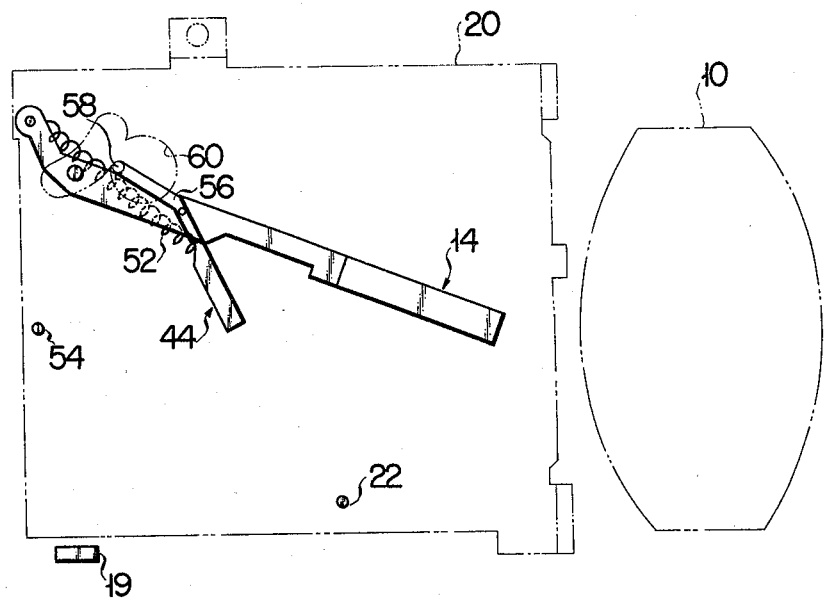

In this state, the shutter releasing operation is completed, and the shutter screen 38 is opened for a given time to expose the surface of the film 40. When the shutter screen 38 is closed, bringing the exposure operation to an end, the driving member which has kicked the kick pin 34 of the movable mirror 14 to force up the movable mirror 14 is removed, so that the movable mirror 14 starts to swing clockwise. Then, as shown in FIG. 8, the detection mirror 44 swings as it is closely in contact with the movable mirror 14 until the pin 58 engages the cam surface of the cam groove 60. After the pin 58 engages the cam surface, the pin 58 is forced up by the cam surface of the cam groove 60, and the detection mirror 44 swings clockwise against the biasing force of the spring 52 to leave the movable mirror 14. When the line of action of the spring 52 comes below the swing axis of the detection mirror 44, as shown in FIG. 9, the direction of the biasing force of the spring 52 on the detection mirror 44 is changed from counterclockwise to clockwise, so that the pin 58 comes off the cam surface of the cam groove 60 and swings clockwise by only the biasing force of the spring 52. Then, in the position as shown in FIG. 4, the movable mirror 14 and the detection mirror 44 engage the first and second stopper pins 22 and 54, respectively, thereby maintaining their respective first positions.

According to the present embodiment of the invention, therefore, it is unnecessary to provide the support plates 20 and 21 with any additional parts for swinging the detection mirror 44. When the movable mirror 14 is at a standstill, the pin 58 of the detection mirror 44 located in the cam groove 60 of the support plate 20 is removed from the cam surface of the cam groove 60 and has nothing to do with the positioning of the detection mirror 44, so that the position of the detection mirror 44 can be adjusted with ease. Further, the pin 58 can engage the cam surface of the cam groove 60 to apply swinging force to the detection mirror 44 only in the middle of the swinging action of the movable mirror 14, never hindering the movement of the movable mirror 14 at the start of the swing thereof. Moreover, the kinetic energy of the accelerated movable mirror 14 is utilized for the drive of the detection mirror 44, so that the impact at the end of the swinging action of the movable mirror 14 can be reduced.

Although in the above embodiment the spring 52 to which biasing force is applied for swinging the detection mirror 44 has been described as being stretched between the tip portion of the detection mirror 44 and the vicinity of the swing axis of the movable mirror 14, one end of the spring may be attached to the support plate 20 in the vicinity of the swing axis of the movable mirror 14 instead of being attached to the vicinity of the swing axis. In short, it is necessary only that the one end of the spring 52 be attached to such a position that the line of action of the spring 52 may cross the swing axis of the detection mirror 44 to reverse the direction of the biasing force on the detection mirror 44 while the detection mirror 44 is swinging.

Figure 10:
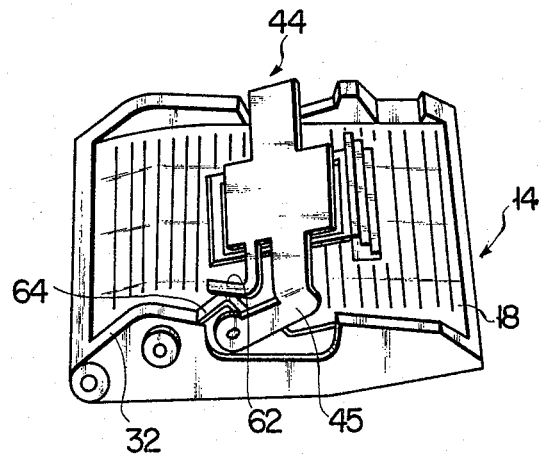
FIG. 10 is a perspective view showing a modification of a spring.

Although a coil spring is used for the spring 52 to apply the biasing force to the detection mirror 44 in the above-mentioned embodiment, it may be replaced with a leaf spring. In this modification, as shown in FIG. 10, an L-shaped spring section 62 extending from one side of the support member 45 of the detection mirror 44 should only be disposed so that the tip of the spring section 62 may engage a convex, chevron-shaped cam section 64 formed on the back of the second side plate 32 of the frame section 18 of the movable mirror 14. Thus, the direction of the biasing force on the detection mirror 44 depends on whether the engaging portion of the spring 62 is on the right-hand slope of the cam section 64 or on the left-hand slope thereof. Namely, the same effect of operation with the above embodiment may be obtained with use of such modification.

Further, although the swing of the detection mirror 44 is achieved by the joint action of the cam groove 60 and the spring 52 in the above embodiment, only the cam groove may be used for that purpose without requiring the spring 52.

Although in the above embodiment the cam groove 60 and the pin 58 have been explained as being formed on the support plate 20 and the extended section 56 of the detection mirror 44, respectively, the cam groove 60 and the pin 58 may alternatively be formed on the extended section 56 of the detection mirror 44 and the support plate 20, respectively.

Furthermore, the pin 58 as the other component of the engaging member according to the above embodiment may be replaced with a rotatable roller, for example.

What is claimed is:

1. In a single-lens reflex camera comprising:
a support plate:
a first mirror having a light transmitting section at a part thereof and pivotally mounted on said support plate to swing between a first position where said first mirror leads light transmitted through a camera lens to a finder section and a second position where said first mirror allows said light to reach a shutter screen;
a second mirror pivotally mounted on said first mirror to swing between a first position where said second mirror leads light transmitting through said light transmitting section in a predetermined direction and a second position where said second mirror blocks up said light transmitting section; and
a mirror driving mechanism for driving said first and second mirrors, said mirror driving mechanism including driving means for swinging said first mirror between said first and second positions,
the improvement wherein:

said camera body has a chamber having at least one side wall, and said support plate comprises one side wall of said chamber, said chamber containing said first mirror therein; and said mirror driving mechanism further includes:
- a cam surface formed in said support plate; and
- an engaging member on said second mirror and capable of engaging said cam surface,
- said cam surface causing said engaging member to swing said second mirror from said first position to said second position when said first mirror is swung from said first position to said second position by said driving means, and to cause said engaging member to swing said second mirror from said second position to said first position when said first mirror is swung from said second position to said first position by said driving means.

2. A single-lens reflex camera according to claim 1, wherein said support plate is provided with a cam groove, said cam surface comprising the peripheral wall of the cam groove.

3. A single-lens reflex camera according to claim 2, wherein said engaging member includes an extended section extending continuously from said second mirror and a pin attached to the extended end of said extended section and capable of engaging said cam surface.

4. A single-lens reflex camera according to claim 3, further comprising another support plate disposed inside the camera body and comprising another side wall of said chamber, said first mirror being swingably supported at both ends thereof by said two support plates.

5. A single-lens reflex camera according to claim 4, wherein said camera includes a lens and a finder section, and wherein said first mirror includes:
- a mirror section comprising a light transmitting portion to transmit light in the vicinity of the optical axis out of light transmitted through said camera lens when said first mirror is in said first position, and a reflecting portion to reflect on the finder section other light than the light in the vicinity of the optical axis; and
- a frame supporting said mirror section, said frame having two support plates facing each other and being pivotally mounted on said two support plates to swing around a pair of first shaft sections on said support plates, respectively, and the extended section of said engaging member extending integrally from said one side plate; and wherein said second mirror includes:
- a mirror section to reflect light transmitting through said light transmitting portion of said first mirror when said second mirror is in said first position, and a support member supporting said mirror section of said second mirror, said support member having two ends and being pivotally mounted at both ends thereof on said two support plates to swing around a pair of second shaft sections.

6. A single-lens reflex camera according to claim 5, wherein said engaging member includes an extended section extending continuously from one support plate side end of the support member of said second mirror; and an engaging pin attached to the extended end of said extended section of said engaging member and being capable of engaging said cam surface.

7. A single-lens reflex camera according to claim 6, further comprising a light sensor disposed in the chamber to receive the light transmitted through said light transmitting portion of said first mirror and reflected by said second mirror when said first mirror is in said first position.

8. A single-lens reflex camera according to claim 7, wherein said light sensor includes a detector for focusing.

9. A single-lens reflex camera according to any one of claims 1, 2, 3, 4, 6, 7 or 8, wherein said mirror driving mechanism further includes urging means for urging said second mirror toward said first position when said first mirror is in said first position, and for urging said second mirror toward said second position when said first mirror is in said second position.

10. A single-lens reflex camera according to claim 5, wherein said mirror driving mechanism further includes urging means for urging said second mirror toward said first mirror when said first mirror is in said first position, and for urging said second mirror toward said second position when said first mirror is in said second position.

11. A single-lens reflex camera according to claim 10, wherein said urging means includes a leaf spring protruding from the support member of said second mirror so that the protruding end of said leaf spring may be pressed against a conical cam section attached to the back of one of the side plates of said first mirror.

12. A single-lens reflex camera according to claim 10, wherein said urging means includes a coil spring, one end of which is fixed between the first and second shaft sections of said another support plate of said first mirror, and the other end of which is attached to the other support plate of said second mirror.

13. A single-lens reflex camera according to claim 12, wherein said mirror driving mechanism includes control means for keeping said engaging member from engaging said cam surface, thereby setting said second mirror in said first position when said first mirror is in said first position.

14. A single-lens reflex camera according to claim 13, wherein said control means includes a control pin attached to said one support plate so that the back of the support member of said second mirror may be pressed against said control pin.

15. A single-lens reflex camera according to claim 14, wherein said engaging member comprises an engaging pin which does not engage said cam surface when said first mirror is in said first position, whereby said second mirror is urged by the urging force of said coil spring toward said first position to be located in said first position;

said engaging pin engages said cam surface as said first mirror swings from said first position to said second position, whereby said second mirror swings from said first position toward said second position against the urging force of said coil spring following said cam surface;

said coil spring moves as said second mirror swings and the direction of the urging force of said coil spring to swing said second mirror is reversed when the line of action of said coil spring goes beyond said second shaft section, whereby said second mirror is urged toward said second position;

said engaging pin is released from engagement with said cam surface as said urging direction is reversed;

said second mirror is located in said second position by the urging force of said coil spring toward said second position;

said engaging pin engages said cam surface as said first mirror swings from said second position to said first position, whereby said second mirror swings from said second position toward said first position against the urging force of said coil spring following said cam surface;

the direction of the urging force of said coil spring to swing said second mirror is reversed when the line of action of said coil spring goes beyond said second shaft, whereby said second mirror is urged toward said second position; and said engaging pin is released from the engagement with said cam surface and said urging direction is reversed, and said second mirror is located in said first position by the urging force of said coil spring toward said first position when said first mirror is returned to said first position.

* * * * *